(12) United States Patent
Brückner

(10) Patent No.: US 11,932,199 B2
(45) Date of Patent: Mar. 19, 2024

(54) TRANSPORTATION VEHICLE, ELECTRONIC VEHICLE RADIO KEY AND SYSTEM FOR PASSIVE ACCESS TO A TRANSPORTATION VEHICLE AND METHODS THEREFOR

(71) Applicant: VOLKSWAGEN AKTIENGESELLSCHAFT, Wolfsburg (DE)

(72) Inventor: Claus-Peter Brückner, Braunschweig (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 18/184,701

(22) Filed: Mar. 16, 2023

(65) Prior Publication Data

US 2023/0219525 A1    Jul. 13, 2023

Related U.S. Application Data

(62) Division of application No. 17/527,266, filed on Nov. 16, 2021, now Pat. No. 11,643,050.

(30) Foreign Application Priority Data

Nov. 16, 2020 (DE) ..................... 10 2020 214 381.1

(51) Int. Cl.
*B60R 25/24* (2013.01)
*G07C 9/00* (2020.01)
(Continued)

(52) U.S. Cl.
CPC ........ *B60R 25/245* (2013.01); *G07C 9/00309* (2013.01); *G07C 9/00571* (2013.01);
(Continued)

(58) Field of Classification Search
CPC .............. B60R 25/245; B60R 2325/10; B60R 2325/101
See application file for complete search history.

(56) References Cited

U.S. PATENT DOCUMENTS 9,961,633 B2    5/2018  Denboer et al.
10,210,687 B2   2/2019  Hiramine
(Continued)

FOREIGN PATENT DOCUMENTS

DE    102017112802 A1    8/2018
DE    102019116747 A1    12/2019
(Continued)

OTHER PUBLICATIONS

Office Action; Japanese Patent Application No. 2021-174374; dated Oct. 26, 2022.
(Continued)

*Primary Examiner* — Nabil H Syed
(74) *Attorney, Agent, or Firm* — Barnes & Thornburg LLP

(57) ABSTRACT

A transportation vehicle having a BLUETOOTH® Low Energy (BLE) system to send and receive BLE advertising signals, BLE connection request signals and BLE data signals via at least one antenna, a central locking system to lock or unlock at least one vehicle door of the transportation vehicle, and a control unit to activate the BLE system and to activate the central locking system based on the BLE data signals. Also disclosed is an electronic vehicle radio key and a system for passive access to a transportation vehicle including a transportation vehicle, an electronic vehicle radio key and a smartphone. The system allows a user passive access to the transportation vehicle, both with the aid of the electronic vehicle radio key and with the aid of the smartphone.

11 Claims, 4 Drawing Sheets

(51) Int. Cl.
*H04W 4/02* (2018.01)
*H04W 4/40* (2018.01)
*H04W 4/80* (2018.01)

(52) U.S. Cl.
CPC .......... *H04W 4/023* (2013.01); *H04W 4/40* (2018.02); *H04W 4/80* (2018.02); *B60R 2325/10* (2013.01); *B60R 2325/101* (2013.01); *B60R 2325/103* (2013.01); *B60R 2325/205* (2013.01); *G07C 2009/00769* (2013.01); *G07C 2209/63* (2013.01)

(56) References Cited

U.S. PATENT DOCUMENTS

| | | |
|---|---|---|
| 10,328,899 B2 | 6/2019 | Golsch |
| 10,414,376 B1 | 9/2019 | Ghannam et al. |
| 10,538,220 B1 | 1/2020 | Tyagi et al. |
| 2014/0253288 A1 | 9/2014 | O'Brien et al. |
| 2015/0120151 A1 | 4/2015 | Akay et al. |
| 2016/0148450 A1 | 5/2016 | Ohshima |
| 2017/0105101 A1 | 4/2017 | Santavicca et al. |
| 2018/0103414 A1 | 4/2018 | Golsch |
| 2019/0053304 A1 | 2/2019 | Ikeda |
| 2019/0090093 A1 | 3/2019 | Odejerte, Jr. |
| 2020/0329356 A1 | 10/2020 | Moloney |
| 2023/0192033 A1* | 6/2023 | Godet .................. G01S 11/06 340/5.61 |

FOREIGN PATENT DOCUMENTS

| | | |
|---|---|---|
| JP | 2017092571 A | 5/2017 |
| JP | 2018165450 A | 10/2018 |
| JP | 2018195871 A | 12/2018 |
| JP | 2019528387 A | 10/2019 |
| JP | 2020100994 A | 7/2020 |
| KR | 20180034423 A | 4/2018 |

OTHER PUBLICATIONS

Search Report; Japanese Patent Application No. 2021-174374; dated Oct. 13, 2022.

* cited by examiner

TRANSPORTATION VEHICLE, ELECTRONIC VEHICLE RADIO KEY AND SYSTEM FOR PASSIVE ACCESS TO A TRANSPORTATION VEHICLE AND METHODS THEREFOR

PRIORITY CLAIM

This patent application is a divisional of U.S. patent application Ser. No. 17/527,266, filed 16 Nov. 2021, which claims priority to German Patent Application No. 10 2020 214 381.1, filed 16 Nov. 2020, the disclosures of which are incorporated herein by reference in their entireties.

SUMMARY

Illustrative embodiments relate to a transportation vehicle with a central locking system and a control unit for activating the central locking system based on BLUETOOTH® Low Energy, BLE, signals. Illustrative embodiments also relate to an electronic vehicle radio key and a system for passive access to a transportation vehicle. Illustrative embodiments also relate to a method for a transportation vehicle, a method for an electronic vehicle radio key and a method for a system for passive access to a transportation vehicle.

BRIEF DESCRIPTION OF THE DRAWINGS

Exemplary embodiments will be explained hereafter by reference to the associated drawings. In the drawings.

DETAILED DESCRIPTION

Figure 1:
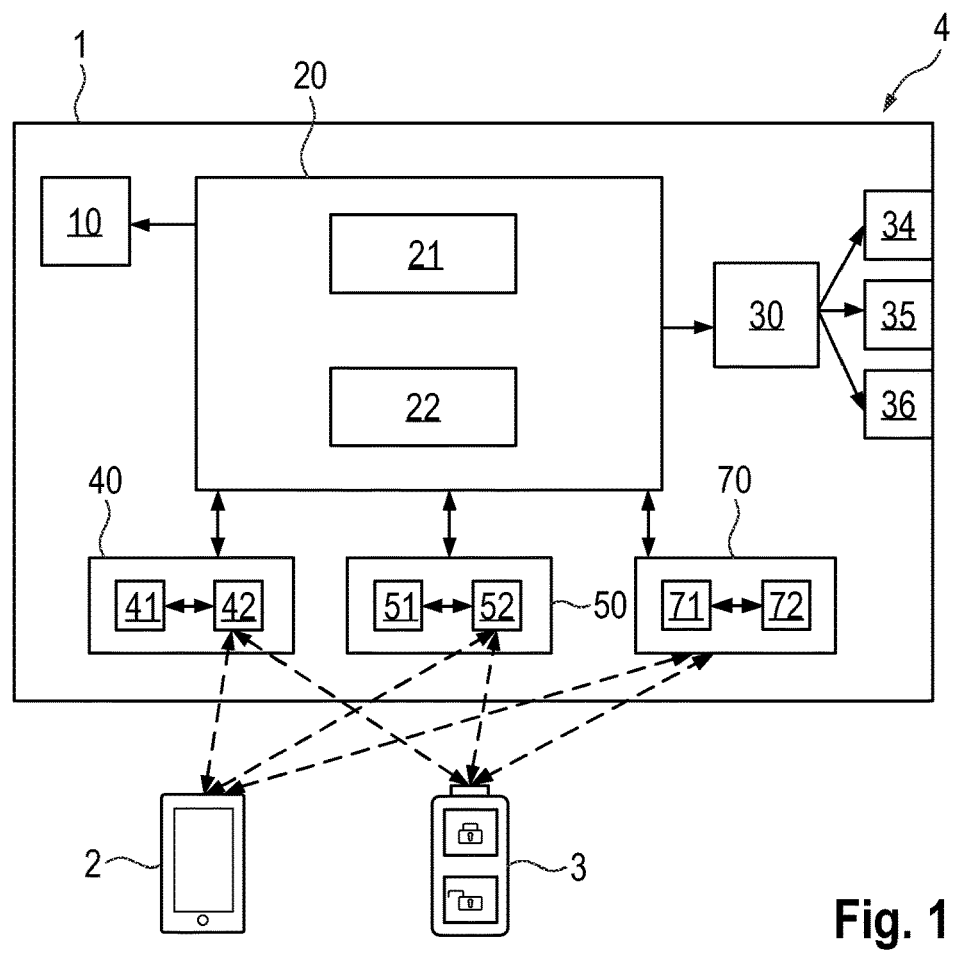
FIG. 1 shows a schematic representation of a disclosed transportation vehicle and an exemplary embodiment of a disclosed system.

Transportation vehicles that allow passive access are essentially well known to the person skilled in the art. In such transportation vehicles, a user does not have to actively use the key; carrying the key with them as an identification feature is sufficient. The transportation vehicle usually automatically detects the approach of the key and allows the doors to be opened. This technology also involves risks, such as possible relay station attacks.

The use of smartphones as a key to a transportation vehicle is becoming more and more common. In particular, car-sharing services, car rental or transportation vehicle fleet operators can thus grant access to transportation vehicles to changing users. But the use of smartphones as vehicle keys is also gaining in importance in the private sphere.

The Car Connectivity Consortium, CCC, is an industry-wide organization that promotes technical solutions for transportation vehicle connectivity globally. With the 'Digital key Release 3' (hereafter CCC DKR3), the CCC has standardized a system for passive and active transportation vehicle access, according to which smartphones can be used as vehicle keys. According to this standard, BLUETOOTH® Low Energy, BLE, technology is also used for communication between transportation vehicles and mobile devices such as smartphones.

According to CCC DKR3, a smartphone functions as a so-called 'master' with respect to the BLE connection, and a transportation vehicle as a so-called 'slave'. This role distribution is not easily transferable to other miniature electronic devices such as a radio key or a wearable, particularly with regard to the high energy consumption of the 'master'.

US 2015/0120151 A1 discloses a vehicle system for activating a vehicle component. US 2016/0148450 A1 discloses a vehicle remote control system and a vehicle-mounted apparatus. DE 10 2019 116 747 A1 discloses a system and methods for locking/unlocking messages of a transportation vehicle.

Disclosed embodiments provide a solution for the use of an electronic vehicle radio key that enables compatibility with the CCC DKR3 with low energy consumption.

This is achieved by a transportation vehicle, an electronic vehicle radio key, and a system consisting of a transportation vehicle, a vehicle radio key and an additional mobile device, in particular, a smartphone. It is also achieved by methods of a transportation vehicle, vehicle radio key, and system.

A first disclosed embodiment relates to a transportation vehicle, in particular, a passenger car, having an internal combustion, electric, or hybrid engine. The transportation vehicle comprises a BLUETOOTH® Low Energy, BLE, system equipped with at least one BLE transceiver, which is configured to send and receive BLE notification signals, BLE notification response signals and BLE data signals via at least one antenna. Within the context of this disclosure, BLE notification signals and BLE notification response signals are used to prepare (establish) a data connection and BLE data signals are used for the actual (user) data transmission.

With reference to the BLE standard, in particular, the BLUETOOTH® Core Specification (version 5.0), BLE notification signals may be identified with "advertising events". During such an "advertising event", data packets may be sent on at least one of three primary "advertising channels". A BLE advertising signal may consist of data packets that are sent consecutively on three different advertising channels. According to the BLE standard, such BLE advertising signals can be sent by a BLE peripheral device as an "advertiser", which assumes the role of the "slave device" in the subsequent data communication.

Within the BLE standard, BLE advertising response signals are called connection requests and can be sent by a so-called initiator, which then becomes the master ("master device") in the subsequent data communication. The initiator may be a central device as defined in the BLE standard. According to the BLE standard, such a "connection request" may be sent to a (peripheral) device from which a BLE advertising signal was received, optionally on the same advertising channel. In addition to 3 (primary) BLE advertising channels, the BLE standard defines 37 data channels for the exchange of data between BLE devices.

The disclosed transportation vehicle has a central locking system which is designed to lock or unlock at least one vehicle door of the transportation vehicle. The central locking system may be an electrically operated central locking system, which is designed to unlock and lock the locks of the at least one vehicle door. The central locking system may be part of an access system of the transportation vehicle.

The disclosed transportation vehicle also has a control unit that is designed to activate the BLE system to send BLE advertising signals to at least one first mobile device and to receive BLE advertising signals from at least one second mobile device. A first mobile device may be a device that can receive BLE advertising signals and, in particular, is a smartphone. However, the first mobile device can also be a smartwatch or a fitness tracker. In principle, however, for a smartwatch or a fitness tracker (fitness watch), the role as a second mobile device is more beneficial in terms of energy consumption, as explained in detail below.

A second mobile device may be a device that can send BLE advertising signals and is optionally a radio key, a smartwatch, a pair of AR glasses, or a fitness tracker. The disclosed transportation vehicle is thus designed both to send BLE advertising signals and to receive BLE advertising signals. The disclosed transportation vehicle is thus optionally designed to assume the role of the peripheral device as an "advertiser" and to send BLE advertising signals, as well as to assume the role of the "BLE Central device" as an "initiator" and to receive and respond to BLE advertising signals.

Furthermore, the control unit is designed to activate the BLE system based on at least one BLE connection request signal, to establish a BLE data connection to the first or the second mobile device, and to transmit BLE data signals via the BLE data connection. A BLE data connection may be established on at least one of the 37 data channels prescribed by the standard, to which a switch may be made after the BLE advertising signal and the BLE connection request signal have been exchanged on an advertising channel. In addition, the BLE advertising signal optionally contains an identification data item. A BLE connection request signal may be sent if it is determined that the identification data item contained in the BLE advertising signal is valid.

The BLE system of the transportation vehicle may establish a BLE data connection to the at least one mobile device based on at least one BLE connection request signal received from the first mobile device. Furthermore, the transportation vehicle's BLE system may establish a BLE data connection to the at least one second mobile device based on at least one connection request signal sent to the second mobile device. The vehicle's BLE system may be designed to establish BLE data connections to the first mobile device and the second mobile device simultaneously. The vehicle's BLE system may also establish BLE data connections to a plurality of first mobile devices based on received BLE connection request signals and/or to a plurality of second mobile devices based on transmitted BLE connection request signals.

The control unit of the disclosed transportation vehicle is further designed to activate the central locking system based on the BLE data signals. The control unit may act as a passive access system for the transportation vehicle. The BLE data signals may contain authentication data, which is exchanged between the transportation vehicle and the at least one first and/or second mobile device. The control unit may be designed to read out the authentication data from the BLE data signals and perform authentication of a user on the basis of the authentication data. If the authentication has been successful, at least one door control unit may be activated to unlock or lock at least one door. If authentication is successful, the transportation vehicle may also be assigned driving readiness by an electronic immobilizer system. The other prerequisites can be the operation of sensors by the user, for example. Additional user input may be required to unlock the door or deactivate the immobilizer.

Within the scope of this disclosure, the control unit is implemented either in a centralized form, for example, as a central control unit of the transportation vehicle, or in a decentralized form, for example, distributed over a plurality of local control units of the transportation vehicle. In the case of decentralized design of the control unit, the functions of the control unit may also be localized in an engine controller (for an electronic immobilizer) or the BLE system. A passive access system pay form part of the disclosed control unit.

In a disclosed embodiment, the role distribution of the vehicle radio key as a BLE slave device and of the transportation vehicle as a BLE master device is retained even after the connection has been established, i.e., during the BLE data connection. To enable a behavior compliant with the CCC standard, the role distribution may be inverted by the corresponding application software in the BLE transceivers of the transportation vehicle and vehicle radio key, or a behavior conformant with the CCC standard for adaptation to the reverse role assignment between the transportation vehicle and mobile device is generated. In an alternative exemplary embodiment, following the establishment of the BLE data connection a role exchange between the transportation vehicle and the vehicle radio key is carried out in conformity with the CCC standard, i.e., the vehicle radio key functions from now on as a BLE "master device" in the BLE data connection and the transportation vehicle functions from now on as a BLE "slave device" during the BLE data connection.

In a disclosed embodiment, the authentication data is formed in conformity with CCC DKR3. In an alternative exemplary embodiment, the authentication data is manufacturer-specific and formed in conformity with the immobilizer system and the central locking system of the transportation vehicle manufacturer. The programming of the authentication data may be carried out by the manufacturer (production or customer service), who can store data in the transportation vehicle as well as in the vehicle key. In the context of this disclosure, the programming of authentication data refers to the local storage or loading of authentication data itself and/or the local storage or loading of data suitable for generating or verifying the authentication data, for example, of cryptographic software, cryptographic data and/or cryptographic keys. Data transmission may be carried out by wired or wireless methods or mechanisms, for example, via vehicle data bus connections, near field communication, NFC, or BLE. It is also optional to program or adapt the authentication data during the operation of the transportation vehicle, in particular, wirelessly and via a mobile network (over the air—OTA). Data may be received via a mobile network from a first mobile device (smartphone) and transmitted from this via BLE to a second mobile device, in particular, a vehicle key. The programmed authentication data, such as the cryptographic keys and/or the cryptographic software, may be stored in a secure storage element.

The disclosed transportation vehicle enables multiple mobile devices to be used as keys for the transportation vehicle. Using the disclosed transportation vehicle, it is particularly made possible to use both mobile devices that act as a BLE peripheral device/slave device/advertiser at least during the establishment of the BLE connection, and mobile devices that act, for example, as a BLE central device/master device/initiator at least during the establishment of the BLE connection, as keys for the transportation vehicle. The disclosed transportation vehicle thus enables a CCC standard-compliant use of a smartphone as well as an energetically beneficial use of a second mobile device, such as a vehicle radio key, for a CCC standard-compatible BLE-based access control to at least one transportation vehicle.

An exemplary embodiment of the disclosed transportation vehicle provides that the at least one first mobile device is a smartphone and the at least one second mobile device is an electronic vehicle radio key. The smartphone thus acts as the first mobile device and receives BLE advertising signals. This enables a standard-compliant communication in accordance with CCC DKR3 between the transportation vehicle and the smartphone for access control. The disclosed transportation vehicle is also designed to communicate additionally with an electronic vehicle radio key for access control, which acts as the second mobile device. The user is thus independent of third-party devices and has the choice of using mobile devices as keys for the transportation vehicle or still using an electronic vehicle radio key. For the disclosed use of the vehicle radio key for access control to the transportation vehicle, the same electronic devices can be used in the transportation vehicle which are also used for the use of the smartphone for access control to the transportation vehicle in conformity with CCC DKR3. Particularly, the use of low-frequency and ultra-high-frequency radio modules previously installed for the use of vehicle radio keys can be dispensed with.

The control unit of the transportation vehicle is also configured to activate the BLE system in such a way that the transmission of BLE advertising signals by the BLE system takes place periodically with a first time interval and the reception of BLE advertising signals by the BLE system takes place between the transmission of each two BLE advertising signals. The BLE standard provides that BLE advertising signals are sent periodically with a fixed time interval, known as the advertising interval. The advertising interval may be chosen by selecting a period between 20 ms and 10.24 s (in intervals of 0.625 ms) and adding a random delay to it of between 0 ms and 10 ms. The first time interval may be 42.5 ms plus a random delay. Furthermore, the first time interval may be the same as the period defined in the CCC DKR3 for the BLE advertising signals sent by the transportation vehicle.

The disclosed transportation vehicle is also designed to activate the BLE system for receiving BLE advertising signals in periods during which the BLE system does not send a BLE advertising signal. The BLE system therefore switches from sending BLE advertising signals to the receiving mode for receiving BLE advertising signals. Between the sending of two (sequences of) BLE advertising signals each the BLE system may be ready to receive BLE advertising signals on each of the three BLE advertising channels.

The disclosed transportation vehicle may also comprise a position detection system for performing a distance measurement for a mobile device. The position detection system may have a transceiver configured to transmit and receive radio signal pulses via at least one antenna. The position detection system may be an ultra-wide band, UWB, system with a UWB transceiver for sending and receiving UWB pulses. The UWB system may be designed according to the IEEE 802.15.4 standard (in particular, the sections on the UWB PHY layer) and/or according to the IEEE 802.15.4Z standard, as described in CCC DKR3. Alternatively, the position detection system may be designed for carrying out a distance measurement based on 2.4 GHz signals (2.4 GHz High Accuracy Distance Measurement, 2.4 GHz Time of Flight Distance Measurement, 2.4 GHz Received Signal Strength Indication method—RSSI). The position detection system may also be designed for performing a distance measurement based on WiFi signals (WiFi Secure Fine Time Measurement or WiFi Fine Time Measurement (according to IEEE 802.11-2016)).

In this exemplary embodiment, the control unit of the transportation vehicle may be designed to activate the position detection system to perform a time-of-flight, ToF, procedure for determining the distance of the at least one first mobile device and/or the at least one second mobile device, particularly in conformity with the CCC DKR3 ToF distance measurement procedure. The control unit may also be configured to activate the central locking system based on the BLE data signals to allow access to the transportation vehicle if the distance between the transportation vehicle and the first mobile device and/or the second mobile device determined by the position detection system falls below a predefined (first) distance. A distance above a predefined (second) distance can optionally be a precondition for locking a vehicle door.

An exact position determination may be carried out by measuring the distances between multiple UWB transceivers in the transportation vehicle and the UWB transceiver (distance determination module) in the first and/or second mobile device. The position detection system of the transportation vehicle then calculates the actual position of the first and/or second mobile device from these multiple distances. The measured distance or the calculated position of the mobile devices may be used in addition to the authentication data. As a result, relay station attacks may be prevented. The control unit (passive access system) may only deactivate an electronic immobilizer system, i.e., grants authorization to drive, if the position detection system has located at least one first or second mobile device inside the transportation vehicle.

Another exemplary embodiment relates to an electronic vehicle radio key, optionally for use with a disclosed transportation vehicle. The electronic vehicle radio key comprises a BLE module having at least one BLE transceiver, which is configured to send BLE advertising signals, to receive BLE connection request signals and for communication by BLE data signals via at least one antenna.

With regard to the BLE standard, in particular, the BLUETOOTH® Core Specification (version 5.0), BLE advertising signals may be referred to as "advertising events". During such an "advertising event", data packets may be sent on at least one of three primary "advertising channels". A BLE advertising signal may consist of data packets that are sent consecutively on three different advertising channels. According to the BLE standard, such BLE advertising signals can be sent by a BLE peripheral device as an "advertiser", which assumes the role of the "slave device" in the subsequent data communication.

Within the BLE standard, BLE advertising response signals are called connection requests and can be sent by a so-called initiator, which then becomes the master ("master device") in the subsequent data communication. The initiator may be a central device as defined in the BLE standard. According to the BLE standard, such a "connection request" may be sent to a (peripheral) device from which a BLE advertising signal was received, optionally on the same advertising channel. In addition to 3 (primary) BLE advertising channels, the BLE standard defines 37 data channels for the exchange of data between BLE devices.

The disclosed electronic vehicle radio key also has a control unit which is configured to activate the BLE module to transmit at least one sequence of BLE advertising signals to a transportation vehicle. The at least one sequence of BLE advertising signals may consist of a plurality of BLE advertising signals. Optionally, the at least one sequence consists of two BLE advertising signals. The disclosed electronic vehicle radio key may act as a BLE peripheral device (slave device/advertiser) with respect to the establishment of a connection to the disclosed transportation vehicle. The BLE advertising signals sent may contain identification data.

Within the scope of the present disclosure, the control unit is either centralized or decentralized in design. In another disclosed embodiment of the vehicle radio key the control unit is a central CPU of the vehicle radio key or a CPU of the BLE module.

The disclosed vehicle radio key can be used with transportation vehicles designed in conformity with CCC DKR3 by the BLE wireless technology used. The role of the vehicle radio key as a BLE peripheral device (slave device/advertiser) has the benefit that the periodic transmission of BLE advertising signals requires less energy than the permanent readiness to receive BLE advertising signals. The electronic vehicle radio key, which in contrast to a transportation vehicle and a smartphone has a considerably smaller energy storage unit, thus performs a more energy-saving role in a standard-compliant BLE advertising process.

Furthermore, the control unit in the vehicle radio key is designed to activate the BLE system based on at least one BLE connection request signal, to establish a BLE data connection to the transportation vehicle, and to transmit BLE data signals via the BLE data connection. A BLE data connection may be established on at least one of the 37 data channels prescribed by the standard, to which a switch may be made after the BLE advertising signal and the BLE connection request signal have been exchanged on an advertising channel. In addition, the BLE advertising signal may contain an identification data item. A BLE connection request signal may be received if the identification data item contained in the BLE advertising signal is valid. The control unit of the vehicle radio key may also be designed to activate the BLE system for a BLE data connection.

The BLE data signals may contain authentication data that is exchanged between the transportation vehicle and the electronic vehicle radio key. The authentication data itself and/or data suitable for generating or verifying the authentication data, such as cryptographic software, cryptographic data and/or cryptographic keys, are optionally stored in a secure element, particularly an eSE, of the electronic vehicle radio key.

Furthermore, the disclosed electronic vehicle radio key may have at least one NFC transceiver with at least one antenna and a secure element, particularly an eSE. The NFC transceiver can be operated by electromagnetically transmitted energy received by the antenna and is therefore independent of an internal power supply of the key. This energy is optionally transmitted by an NFC communication unit of a disclosed transportation vehicle. The safe element of the vehicle radio key may be also connected or can be connected to the BLE transceiver. Authentication data stored in the secure element and/or data suitable for generating or verifying the authentication data, such as cryptographic software, cryptographic data and/or cryptographic keys, can thus be exchanged via NFC and BLE for the purpose of authentication. The authentication for transportation vehicle access can, therefore, be carried out via BLE for passive transportation vehicle access as well as via NFC, particularly if the vehicle radio key battery is discharged. Optionally, the secure element stores information that allows access control to a plurality of transportation vehicles.

In an exemplary embodiment of the disclosed vehicle radio key, it is provided that the transmission of the at least one sequence of BLE advertising signals by the BLE module is carried out either periodically or only once based on a user input on the vehicle radio key. Thus, the transmission of the advertising signal sequence may be repeated regularly with a fixed time interval, without the need for user input. Alternatively, the advertising signal sequence is sent once, immediately after a user input is made. The user input may be captured by at least one input method or mechanism, for example, a button or a touch pad of the vehicle radio key. An advertising signal sequence sent due to a user input particularly may consist of a plurality of BLE advertising signals sent at short intervals, in particular, at intervals of less than 500 ms. In particular, the signal spacing of a manually triggered advertising signal sequence is shorter than the signal spacing of a passive (periodically) transmitted advertising signal sequence, to accelerate the establishment of the BLE data connection and minimize the response time. Furthermore, the manually triggered BLE advertising signals may be broadcast with a higher transmitting power than the passive (periodically) transmitted BLE advertising signals. The manually triggered BLE advertising signals are also sent as standard-compliant BLE long range signals. The manually triggered advertising signals from the transportation vehicle can also be used for functions other than the access control, such as operating a parking heater, an air conditioning system, or starting the engine. The transmission with higher transmission power and/or as a BLE long range signal enables control, even from a long distance.

The control unit may also be configured to switch the BLE module to a power-saving mode or to switch it off entirely between the transmission of two sequences of BLE advertising signals. This means that the vehicle radio key is in an energy-saving mode when it is not transmitting any signals, which additionally saves energy. Optionally, the energy saving mode of the BLE module can be canceled (Wake Up) if an operator input is made on the vehicle radio key or a timer determines the time for sending the next periodic BLE advertising signal sequence.

The disclosed vehicle radio key may also comprise a distance-determination module with at least one transceiver and at least one antenna for carrying out a distance measurement. The distance detection system may be an ultra-wide band, UWB, system with a UWB transceiver for sending and receiving UWB pulses. The UWB system may be designed according to the IEEE 802.15.4 standard (in particular, the sections on the UWB PHY layer) and/or according to the IEEE 802.15.4Z standard. Alternatively, the distance detection system may be designed to carry out a distance measurement based on 2.4 GHz signals (2.4 GHz High Accuracy Distance Measurement, 2.4 GHz Time of Flight Distance Measurement, 2.4 GHz Received Signal Strength Indication method—RSSI). The distance detection system may also be designed to perform a distance measurement based on WiFi signals (WiFi Secure Fine Time Measurement or Fine Time Measurement (according to IEEE 802.11-2016)).

The control unit of the vehicle radio key is configured to activate the BLE module in such a way that the sequence of BLE advertising signals is transmitted periodically with a second time interval, each sequence consisting of at least two BLE advertising signals with a third time interval. The second time interval may be longer than the first time interval arranged between the transmission of two BLE advertising signals of the transportation vehicle. The third time interval may be shorter than the first time interval. The second time interval is the time interval between the transmission of the first BLE advertising signal in a sequence and the transmission of the first BLE advertising signal in the next sequence. The second time interval may be longer than the first and the third time intervals. The second time interval is optionally 500 ms in length, for example. The second time interval can also be variable. The third time interval may be the time interval between the at least two BLE advertising signals in a transmitted sequence of BLE advertising signals. The BLE standard provides that BLE advertising signals are sent periodically with a time interval known as the advertising interval. The advertising interval may be chosen by selecting a period between 20 ms and 10.24 s (in intervals of 0.625 ms) and adding a random delay to it of between 0 ms and 10 ms. The third time interval may correspond to such a BLE "advertising interval" with a length of 20 ms plus a random delay.

According to this exemplary embodiment of the disclosed electronic vehicle radio key, a connection is established to the transportation vehicle within a response time of a passive access system of a transportation vehicle, which in this case is implemented by the control unit, of 500 ms. The transportation vehicle's BLE system cannot receive any BLE advertising signals from the electronic vehicle radio key while it is sending BLE advertising signals itself. The periodic transmission of the BLE advertising signal sequences with the time intervals described above will ensure that at least one BLE advertising signal of a BLE advertising signal sequence sent by the vehicle radio key within a period of 500 ms is received by the transportation vehicle's BLE system.

In another exemplary embodiment of the disclosed electronic vehicle radio key, a motion sensor is included and the control unit is designed to receive sensor signals from the motion sensor and to assume an operating state depending on the received sensor signals. In particular, the control unit is designed to switch off other modules in the vehicle radio key and to transfer to a stand-by mode itself if the sensor signals of the motion sensor indicate that the electronic vehicle radio key is at rest. This can save energy and can be used to prevent relay station attacks when the key is in a standby position.

In a further exemplary embodiment of the disclosed electronic vehicle radio key, the electronic vehicle radio key additionally features a device for wirelessly charging its battery, wherein the device may be charged with a Wireless Power Charging, WPC, system according to the QI standard, integrated in the transportation vehicle. The battery of the vehicle radio key is therefore rechargeable and can be charged in the transportation vehicle when the key battery is discharged or with commercially available QI WPC devices outside the transportation vehicle.

Another exemplary embodiment relates to a system for passive access control which comprises a disclosed transportation vehicle, a disclosed vehicle radio key and, in addition, a smartphone as the first mobile device.

At least one exemplary embodiment of the disclosed system for passive access to a transportation vehicle provides that the control unit of the electronic vehicle radio key is configured to activate the BLE module in such a way that the sequence of BLE advertising signals is transmitted periodically with a second time interval and that each sequence consists of at least two BLE advertising signals with a third time interval, the second time interval optionally being longer than the first time interval and the third time interval being shorter than the first time interval. The second time interval is the time interval between the transmission of the first BLE advertising signal in a sequence and the transmission of the first BLE advertising signal in the next sequence. The second time interval may be longer than the first and the third time intervals. The second time interval may be 500 ms. The third time interval may be the time interval between the at least two BLE advertising signals in a transmitted sequence of BLE advertising signals. The BLE standard provides that BLE advertising signals are sent periodically with a fixed time interval, known as an advertising interval. The advertising interval may be chosen by selecting a period between 20 ms and 10.24 s (in intervals of 0.625 ms) and adding a random delay to it of between 0 ms and 10 ms. The first time interval may be 42.5 ms plus a random delay. The third time interval may correspond to such a BLE "advertising interval" with a length of 20 ms plus a random delay.

This exemplary embodiment of the disclosed system causes a connection to be established to the vehicle key within the response time of a passive access system of a transportation vehicle, which in this case is implemented by the control unit, of 500 ms. The BLE system of the transportation vehicle cannot receive any BLE advertising signals from the vehicle radio key while it is itself sending BLE advertising signals to the smartphone. The periodic transmission of the sequences of BLE advertising signals with the time intervals described above ensures that at least one BLE advertising signal is received by the BLE system of the transportation vehicle within an interval of 500 ms of an advertising signal sequence.

Another exemplary embodiment relates to a method of a transportation vehicle, as described above, with a BLUETOOTH® Low Energy, BLE, system which comprises at least one BLE transceiver and at least one antenna, with a central locking system which is designed to unlock or lock at least one vehicle door of the transportation vehicle, and with a control unit.

The disclosed method of a transportation vehicle also has a first method operation of sending BLE advertising signals to at least one first mobile device and receiving BLE advertising signals from at least one second mobile device. The first mobile device may be a smartphone and the second mobile device may be an electronic vehicle radio key. The transmitted and received BLE advertising signals may contain identification data. In a second operation of the disclosed method of a transportation vehicle, the transportation vehicle receives BLE connection request signals from the at least one first mobile device and/or sends BLE connection request signals to the at least one second mobile device. Optionally, the BLE advertising signals sent and received contain identification data. The BLE connection request signals from the at least one first mobile device may be received after a BLE advertising signal has been sent from the transportation vehicle to the first mobile device. The BLE connection request signals are sent to the at least one second mobile device optionally after a BLE advertising signal from the second mobile device has been received by the transportation vehicle.

The disclosed method of a transportation vehicle provides a third method operation of establishing a first BLE data connection to the first mobile device based on at least one received BLE connection request signal, and/or establishing a second BLE data connection to the second mobile device based on at least one transmitted BLE connection request signal. The first and/or second BLE data connection may be established if an exchange of at least one BLE advertising signal and at least one BLE connection request signal has taken place between the transportation vehicle and the first or second mobile device. The BLE data connection may only be established if an identification data item of at least one BLE advertising signal is valid. A BLE data connection may be established on at least one of the 37 data channels according to the standard, to which a switch may be made after a BLE advertising signal and the BLE connection request signal have been exchanged on an advertising channel.

A fourth operation of the disclosed method of a transportation vehicle comprises transmission of BLE data signals via the first and/or second BLE data connection. In an exemplary form of implementation, the role distribution of the vehicle radio key as a BLE slave device and the transportation vehicle as a BLE master device is maintained even after the connection has been established, i.e., during the BLE data connection. Nevertheless, to enable a behavior conformant with the CCC standard, the role distribution may be inverted by appropriate application software in the BLE transceivers of the transportation vehicle and vehicle radio key, or a behavior is generated that conforms with the CCC standard for adaptation to the reversed role assignment between the transportation vehicle and mobile device. In an alternative exemplary embodiment, following the establishment of the BLE data connection a role exchange between the transportation vehicle and the vehicle radio key is carried out in conformity with the CCC standard, i.e., the vehicle radio key functions as a BLE master device during the BLE data connection and the transportation vehicle functions as a BLE slave device.

In a fifth operation of the disclosed method of a transportation vehicle, the central locking is activated based on the BLE data signals. The BLE data signals may contain authentication data which is exchanged between the transportation vehicle and the at least one first and/or second mobile device. The authentication data may be read out of the BLE data signals and authentication of a user may be carried out on the basis of the authentication data. If the authentication data has been used to successfully authenticate a user, the central locking system may be activated to unlock a vehicle door and/or to deactivate an immobilizer. Additional user input may be required to unlock the door or deactivate the immobilizer.

In a disclosed embodiment, the authentication data is formed in conformity with CCC DKR3. In an alternative exemplary embodiment, the authentication data is manufacturer-specific and optionally formed in conformity with the immobilizer system and the central locking system of the manufacturer. The programming of the authentication data may be carried out by the manufacturer (production or customer service), who can load data into the transportation vehicle as well as into the vehicle key. In the context of this disclosure, the programming of authentication data refers, in particular, to the local storage or loading of authentication data itself and/or the local storage or loading of data suitable for generating or verifying the authentication data, for example, of cryptographic software, cryptographic data and/or cryptographic keys. The data transmission may be carried out by wired or wireless method or mechanism, for example, via vehicle data bus connections, NFC, or BLE. It is also optional to program or adapt the authentication data during the operation of the transportation vehicle, in particular, wirelessly and via a mobile network (over the air—OTA). Data is received optionally via a mobile network from a first mobile device (smartphone) and transmitted from this via BLE to a second mobile device, in particular, a vehicle key.

The programmed data, such as the cryptographic keys and/or the cryptographic software, may be stored in a secure storage element.

Extensions of the disclosed method of the transportation vehicle correspond to the extensions described for the disclosed transportation vehicle.

A further exemplary embodiment relates to a disclosed method of an exemplary electronic vehicle radio key, with a BLE module and a control unit. In a first method operation, the method comprises sending at least one sequence of BLE advertising signals. The at least one sequence of BLE advertising signals may consist of a plurality of BLE advertising signals, optionally two BLE advertising signals. In this method operation, the vehicle key may act as a BLE peripheral device (slave device/advertiser) with respect to a disclosed transportation vehicle and sends the BLE advertising signal sequence optionally to a disclosed transportation vehicle. The BLE advertising signals sent may contain at least one identification data item.

In a second operation of the disclosed method of an electronic vehicle radio key, at least one BLE connection request signal is received. The at least one BLE connection request signal may be received after a BLE advertising signal has been sent. Connection request signals that were sent by a disclosed transportation vehicle may be received after a BLE advertising signal has been sent from the electronic vehicle radio key to the transportation vehicle.

A third operation of the disclosed method of an electronic vehicle radio key provides for establishing a BLE data connection based on at least one BLE connection request signal. The BLE data connection may be established with the device that sent the BLE connection request signal. After the electronic vehicle radio key has sent a BLE advertising signal, the BLE advertising signal has been received by the transportation vehicle and a BLE connection request signal has been sent from the transportation vehicle to the electronic vehicle radio key, both may change over to at least one BLE data channel, thus establishing a BLE data connection.

In a fourth operation of the disclosed method of an electronic vehicle radio key provides for sending and receiving BLE data signals via the BLE data connection. The BLE data signals may contain authentication data which is exchanged between the electronic vehicle radio key and the device connected to it, in particular, the transportation vehicle. The authentication data and/or data suitable for generating or verifying the authentication data, such as cryptographic software, cryptographic data and/or cryptographic keys, may be stored on a secure element of the electronic vehicle radio key, optionally in an "electronic Secure Element", eSE.

Extensions of the disclosed method of the electronic vehicle radio key correspond to the extensions described with reference to the disclosed electronic vehicle radio key.

Another exemplary embodiment relates to a method of a system for passive access to a transportation vehicle, the system comprising a disclosed transportation vehicle, an exemplary electronic vehicle radio key, and a smartphone.

The disclosed method for a system comprises as a first method operation periodically sending BLE advertising signals with a first time interval and receiving BLE advertising signals between the transmission of each two BLE advertising signals, in each case by the transportation vehicle. In other words, the BLE advertising signals are sent by the BLE system of the transportation vehicle on a recurring basis after a period of time corresponding to the first time interval. The first time interval may correspond to an advertising interval of 42.5 ms plus a random delay.

In the first method operation, therefore, BLE advertising signals are received by the BLE system during periods in which the BLE system of the transportation vehicle does not send a BLE advertising signal. In other words, the BLE system of the transportation vehicle switches from sending BLE advertising signals to the receiving mode for receiving BLE advertising signals and back. During the time periods between the sending of two BLE advertising signals in each case, the BLE system of the transportation vehicle may be ready to receive BLE advertising signals on at least one BLE advertising channel.

In a second operation of the disclosed method for a system, the smartphone receives BLE advertising signals periodically. The smartphone may be designed to conform to CCC DKR3. The smartphone may be ready to receive on at least one of the three BLE advertising channels periodically.

A third operation of the disclosed method for a system provides for periodically sending a sequence of BLE advertising signals with a second time interval by the electronic vehicle radio key, each sequence consisting of two BLE advertising signals with a third time interval and the second time interval being longer than the first time interval and the third time interval being shorter than the first time interval. The second time interval is the time interval between the transmission of the first BLE advertising signal in a sequence and the transmission of the first BLE advertising signal in the next sequence. The second time interval may be longer than the first and the third time intervals. The second time interval may be 500 ms. The third time interval may be the time interval between the at least two BLE advertising signals in a transmitted sequence of BLE advertising signals. The BLE standard provides that BLE advertising signals are sent periodically with a time interval known as the advertising interval. The advertising interval may be chosen by selecting a period between 20 ms and 10.24 s (in intervals of 0.625 ms) and adding a random delay to it of between 0 ms and 10 ms. The first time interval as a BLE "advertising interval" is optionally 42.5 ms plus a random delay. The third time interval as a BLE "advertising interval" may have a length of 20 ms plus a random delay.

A fourth operation of the disclosed method for a system comprises establishing a BLE data connection, based on at least one BLE connection request signal, between the transportation vehicle and the electronic vehicle radio key or the smartphone. In other words, after an exchange of BLE advertising signal and BLE connection request signal between two devices, these two devices (transportation vehicle and key or smartphone) switch to a BLE data channel.

The BLE advertising signals may contain an identification data item. A BLE data connection may be established between the transportation vehicle and the electronic vehicle radio key or the smartphone if the at least one identification data item is valid. The BLE system may establish parallel BLE data connections to the smartphone and the electronic vehicle radio key based on BLE connection request signals received or sent.

In a fifth operation of the disclosed method for a system, BLE data signals are sent and received via the BLE data connection. The BLE data signals may contain authentication data that is exchanged between the transportation vehicle and the smartphone or the transportation vehicle and the electronic vehicle radio key. The authentication data may conform to CCC DKR3 or may also be manufacturer-specific.

A sixth operation of the disclosed method of the system involves activating the central locking system of the transportation vehicle based on the BLE data signals. The BLE data signals may contain authentication data which is exchanged between the transportation vehicle and the at least one first and/or second mobile device. The authentication data may be read out of the BLE data signals and an authentication of a user may be carried out on the basis of the authentication data. If the authentication data has been used for a successful authentication, a vehicle door may be unlocked/locked and/or an immobilizer may be deactivated. Additional user input may be required to unlock/lock the door or deactivate the immobilizer.

The above-mentioned control units of the transportation vehicle and/or the vehicle radio key may be implemented by electrical or electronic components (hardware) or by firmware (ASIC). In addition or alternatively, the functionality of the control unit is realized by executing a suitable program (software). The disclosed method may also be realized by a combination of hardware, firmware and/or software. For example, individual components of a control unit for providing individual functions are implemented as a separate integrated circuit or arranged on a common integrated circuit.

The individual components of the disclosed control units may also be implemented as one or more processes which run on one or more processors in one or more electronic computing devices and are generated when one or more computer programs are executed. The computing devices may be designed to cooperate with other components, for example, a BLE system or module, a central locking system, an engine controller etc., to implement the functionalities described herein. The instructions of the computer programs may be stored in memory, such as a RAM element.

It will also be clear to the person skilled in the art that the functionalities of a plurality of computers (data processing devices) can be combined or can be combined in a single device, or that the functionality of a particular data processing device can be distributed over a plurality of devices to implement the functionality of the control unit.

Extensions of the disclosed method of the system correspond to the extensions described for the disclosed electronic system.

The various disclosed embodiments cited in this application, unless stated otherwise for each case, can be combined with one another.

FIG. 1 shows a schematic representation, in particular, a block diagram, of a disclosed transportation vehicle 1 and a disclosed system 4 according to an exemplary embodiment. The system 4 consists of the transportation vehicle 1, a smartphone 2 and an electronic vehicle radio key 3.

The transportation vehicle 1 has a BLE system 40 with a BLE transceiver 41 for sending and receiving BLE advertising signals, BLE connection request signals and BLE data signals. The BLE signals can be exchanged with the smartphone 2 and/or the electronic vehicle radio key 3 via a BLE antenna 42. In addition, the transportation vehicle 1 has a UWB System 50 with a UWB transceiver 51 for sending and receiving radio signal pulses. The radio signal pulses can be exchanged with the smartphone 2 and/or the electronic vehicle radio key 3 via a UWB antenna 52. The transportation vehicle also comprises an NFC system 70 with a transceiver 71 for sending and receiving NFC signals. The NFC signals can be exchanged with the smartphone 2 and/or the electronic vehicle radio key 3 via an NFC antenna 72. The NFC system also comprises a secure element 73, such as an electronic secure element (eSE).

The transportation vehicle 1 also comprises a central locking system 30 for unlocking and locking at least one vehicle door 34, 35, 36 of the transportation vehicle 1. The central locking system 30 controls a first door 34, in particular, a driver's door 34, a second door 35, in particular, a passenger door 35, and a third door 36, in particular, a tailgate 36 of the transportation vehicle 1.

In addition, the transportation vehicle 1 has an engine controller 10 which checks the condition of the engine of the transportation vehicle 1, in particular, the deactivation of the engine immobilizer.

A control unit 20 of the transportation vehicle 1 with a CPU 21 and an internal memory 22 is designed to communicate with the BLE system 40, the UWB system 50 and the NFC system 70, and to activate the motor controller 10 and the central locking system 30. The control unit 20 is designed to activate the BLE system 40 to establish a BLE data connection to the smartphone 2 and/or the electronic vehicle radio key 3. From the BLE data signals sent via the BLE data connection, the control unit 20 can also determine authorizations for passive access to the transportation vehicle. Data required by the control unit 20 for determining the authorizations, such as cryptographic software, cryptographic data and/or cryptographic keys, are stored in a secure storage element.

In addition, the control unit 20 in this exemplary use case is designed to activate the UWB system 50 to perform a time-of-flight, ToF, procedure, with which the distance of the smartphone 2 or the electronic vehicle radio key 3 from the transportation vehicle 1 is determined. Based on the results of reading out the BLE data signals and the ToF procedure, the control unit 20 can then activate the central locking system 30 to unlock or lock one or more vehicle doors 34, 35, 36 or the engine controller 10 to deactivate the engine immobilizer. In this way, the control unit 20 of the transportation vehicle 1 is able to enable passive access to the transportation vehicle 1, for example, to unlock the vehicle doors 34, 35, 36 when a user of the transportation vehicle approaches with a matching electronic vehicle radio key 3 or a smartphone 2.

Figure 2:
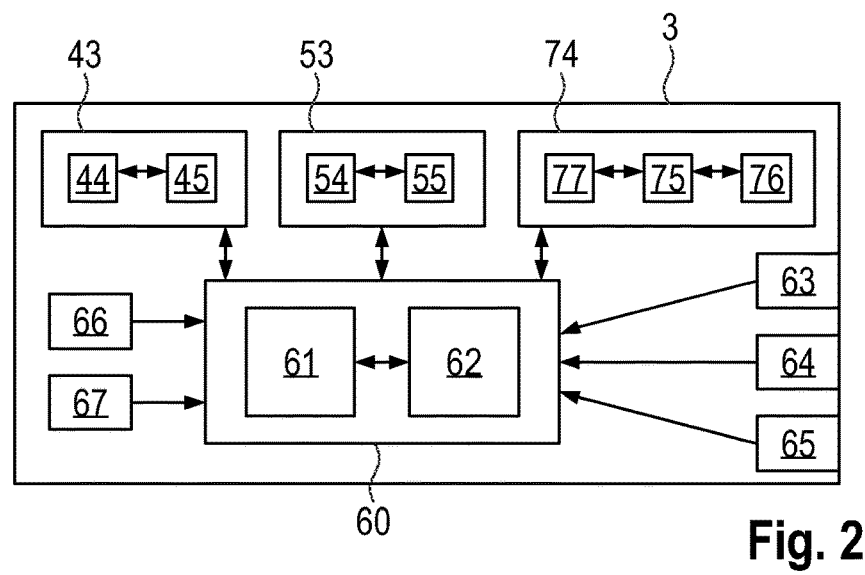
FIG. 2 shows a schematic representation of an exemplary embodiment of an electronic vehicle radio key.

FIG. 2 shows a schematic representation of a disclosed electronic vehicle radio key 3 according to one exemplary embodiment. The electronic vehicle radio key 3 has its own control unit 60 with a CPU 61 and an internal memory 62, which is designed to communicate with all other components of the electronic vehicle radio key 3. As an alternative to the central embodiment shown in FIG. 2, the control unit 60 can also have a decentralized structure, in particular, at least one, optionally each module 43, 53, 74 of the electronic vehicle radio key 3 in the decentralized form having a dedicated control unit, in particular, a dedicated control unit with a CPU and an internal memory.

The control unit 60 can activate the BLE module 43 of the electronic vehicle radio key 3 to send BLE advertising signals, to receive BLE connection request signals and to establish a BLE data connection, as well as to send and receive BLE data signals via this data connection. To implement this, the BLE module 43 comprises a BLE transceiver 44 and a BLE antenna 45. The BLE advertising signals are either sent passively as recurring sequences of at least two BLE advertising signals, or once as a sequence of at least two BLE advertising signals based on a user input via at least one of the sensors 63, 64, 65, which is captured by the control unit 60. The sensors 63, 64, 65 are, for example, electrical buttons, capacitive buttons, piezoelectric buttons, a touch screen, or a touch pad.

For example, the control unit 60 activates the BLE module 43, when additional user input is made via the first sensor 63, to send BLE signals to the transportation vehicle 1 so that the latter is caused to unlock the vehicle doors 34, 35, 36. For example, in this manual transmission of BLE signals the control unit 60 controls the BLE module 43 to send BLE signals with a higher transmission power or as BLE Long Range signals, so that they have a longer range than passively transmitted sequences of BLE signals. Due to the longer range of the manually activated signals, further functions of the transportation vehicle 1 can be triggered with the electronic vehicle radio key 3, for example, a parking heater can be activated or a horn triggered.

Furthermore, the control unit 60 of the electronic vehicle radio key 3 is designed to activate a UWB module 53 of the electronic vehicle radio key 3. The UWB module 53 consists of a UWB transceiver 54 which is configured for sending and receiving radio signal pulses via a UWB antenna 55. The control unit 60 can activate the UWB module 53 to perform a ToF procedure to determine a distance between the transportation vehicle 1 and the electronic vehicle radio key 3.

By using the BLE module 43 and the UWB module 53, the control unit 60 of the vehicle radio key 3 can provide passive access to the transportation vehicle 1 by exchanging signals for authentication and signal pulses for distance measurement with this BLE.

In addition, the electronic vehicle radio key 3 comprises an NFC module 74 with an NFC transceiver 75, an integrated secure element 77 (electronic secure element, eSE) and an antenna 76. The NFC transceiver 75 of the electronic vehicle radio key 3 does not require an additional energy supply from a key battery, but can be supplied with energy via an NFC system 70 of the transportation vehicle 1. The NFC module 74 thus allows access to the transportation vehicle 1 even when the key battery is discharged. Emergency access to the transportation vehicle 1 is thus also possible without a mechanical emergency key. The secure element may contain access authorization data for a plurality of transportation vehicles 1, such as cryptographic software, cryptographic data and/or cryptographic keys. This allows access to a plurality of transportation vehicles 1 with only one electronic vehicle radio key 3, even when the key battery is discharged.

The vehicle radio key 3 also contains a motion sensor 66 and a wireless charging device 67 for the battery of the vehicle radio key 3.

Figure 3:
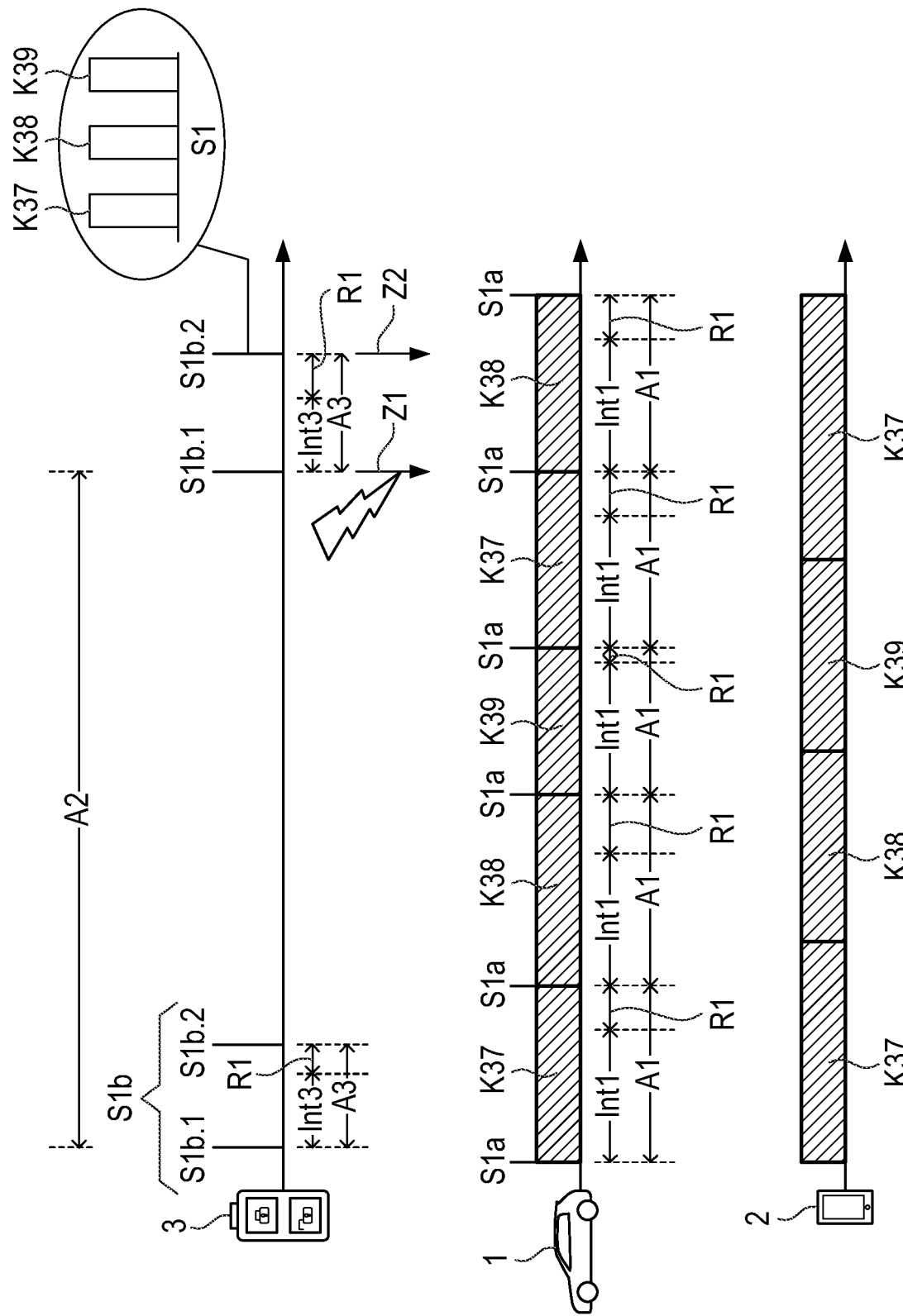
FIG. 3 shows a schematic representation of a BLE advertising process in an exemplary embodiment of a disclosed system.

FIG. 3 shows an exemplary BLE advertising process or an exemplary BLE advertising communication in a disclosed system 4 for passive access to a transportation vehicle 1 via a smartphone 2 and via an electronic vehicle radio key 3 according to an exemplary embodiment.

According to CCC DKR3, the smartphone 2 is ready to receive BLE advertising signals on one of the three BLE advertising channels K37, K38, K39 for limited periods of time. To simplify the drawing, a permanent receive mode of the smartphone 2 is shown. In reality, the smartphone 2 will only be intermittently ready to receive.

The transportation vehicle 1 periodically transmits BLE advertising signals S1a with a first time interval A1 and is ready to receive BLE advertising signals S1b between the transmission of each two BLE advertising signals S1a. The first time interval A1 corresponds to an advertising interval Int1, in particular, a standard-compliant BLE advertising interval Int1 of 42.5 ms plus a random delay R1. During the time periods between the transmission of two BLE advertising signals S1a, the transportation vehicle 1 is ready to receive on at least one of the three BLE advertising channels K37, K38, K39, optionally alternately on the BLE advertising channels K37, K38, K39 in successive time intervals.

The electronic vehicle radio key 3 periodically sends a sequence of BLE advertising signals S1*b* with a second time interval A2, each sequence consisting of two BLE advertising signals S1*b*.1, S1*b*.2 with a third time interval A3. The second time interval A2 is longer than the first time interval A1 and the third time interval A3 is shorter than the first time interval A1. The second time interval A2 here is 500 ms. The third time interval A3 is the time interval between the at least two BLE advertising signals S1*b*.1, S1*b*.2 in a transmitted sequence of BLE advertising signals S1*b* and corresponds to a BLE advertising interval Int3 of 20 ms plus a random delay R1.

The BLE advertising signals S1*a* sent by the transportation vehicle 1 and the BLE advertising signals S1*b* sent by the electronic vehicle radio key 3 each consist of data packets which are transmitted consecutively on the three BLE advertising channels K37, K38, K39. This is illustrated in FIG. 3 by the magnifying glass view. After sending a data packet on a BLE advertising channel, for example, BLE advertising channel K37, the BLE module 43 of the vehicle radio key 3 is ready to receive connection request signals on this BLE advertising channel, for example, BLE advertising channel K37, before it sends another data packet on the next advertising channel, for example, BLE advertising channel K38.

The BLE system 40 of the transportation vehicle 1 cannot receive any BLE advertising signals S1*b* from the electronic vehicle radio key 3 while it is itself sending BLE advertising signals S1*a* to the smartphone 2. An example of such a case is shown in FIG. 3 at the time Z1. After a third time interval A3, the electronic vehicle radio key 3 then sends the second BLE advertising signal S1*b*.2 of the sequence. Since the third time interval A3 is shorter than the first time interval A1, the second advertising signal S1*b*.2 at the time Z2 falls within a reception period of the transportation vehicle 1.

The periodic transmission of the sequences of BLE advertising signals S1*b* with the time intervals A1, A2, A3 described above ensures that at least one BLE advertising signal S1*b* is received by the BLE system 40 of the transportation vehicle 1 within a period A2 and thus a BLE connection is established between transportation vehicle 1 and vehicle radio key 3 within this period.

Figure 4:
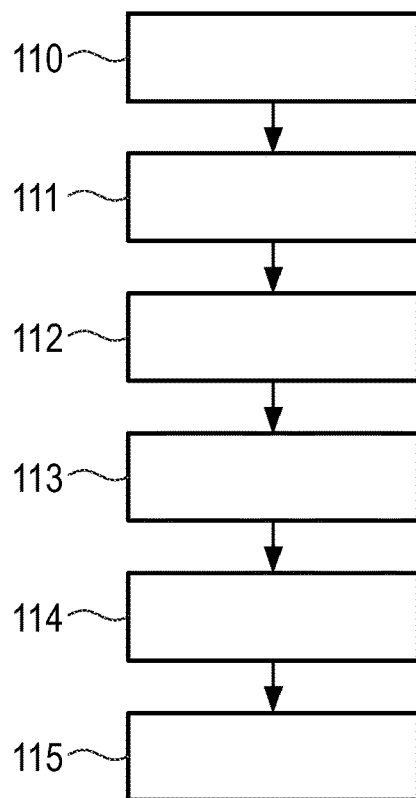
FIG. 4 shows a schematic representation of a disclosed method of an exemplary embodiment of a transportation vehicle.

FIG. 4 shows a schematic representation of a disclosed method of a transportation vehicle 1 according to an exemplary embodiment. In a first method operation at 110, BLE advertising signals S1*a* are sent from the transportation vehicle 1 to a smartphone 2 as the first mobile device and BLE advertising signals S1*b* are received from an electronic vehicle radio key 3 as the second mobile device.

In a second operation at 111 of the transportation vehicle 1 method, the transportation vehicle BLE receives connection request signals S2*a* from the smartphone 2 and sends BLE connection request signals S2*b* to the electronic vehicle radio key 3. The reception of the BLE connection request signals S2*a* from the smartphone 2 takes place after a BLE advertising signal S1*a* has been sent from the transportation vehicle 1 to the smartphone 2. The BLE connection request signals S2*b* are sent to the electronic vehicle radio key 3 after a BLE advertising signal S1*b* has been received from the electronic vehicle radio key 3 by the transportation vehicle 1.

In a third method operation at 112, a first BLE data connection to the smartphone 2 is established based on at least one received BLE connection request signal S2*a* and/or a second BLE data connection to the electronic vehicle radio key 3 based on at least one transmitted BLE connection request signal S2*b*. The first or second BLE data connection is established if an exchange of at least one BLE advertising signal S1 and at least one BLE connection request signal S2 between the transportation vehicle 1 and the smartphone 2 or the electronic vehicle radio key 3 has taken place and the identification data item contained in the BLE advertising signal S1 is valid.

A fourth operation at 113 consists of transmitting BLE data signals S3 via the first and/or second BLE data connection. The BLE data signals S3 contain authentication data that is exchanged between the transportation vehicle 1 and the smartphone 2 or the transportation vehicle 1 and the electronic vehicle radio key 3.

In this exemplary embodiment of the method of a transportation vehicle 1 shown, a time-of-flight, ToF, procedure for determining the distance between the transportation vehicle 1 and the smartphone 2 or the electronic vehicle radio key 3 is performed in a fifth operation at 114.

In a sixth method operation at 115, the central locking system 30 of the transportation vehicle 1 is activated by the control unit 20 based on the BLE data signals S3 if the distance between the transportation vehicle 1 and the smartphone 2 or the electronic vehicle radio key 3 falls below a predefined distance. In particular, the central locking system 30 is activated to unlock a vehicle door 34.

After a user has entered the transportation vehicle 1, in a seventh method operation (not shown) the smartphone 2 or the electronic vehicle radio key 3 is located using the UWB system 50 in the transportation vehicle interior. The immobilizer is then deactivated if the authentication was successful.

Figure 5:
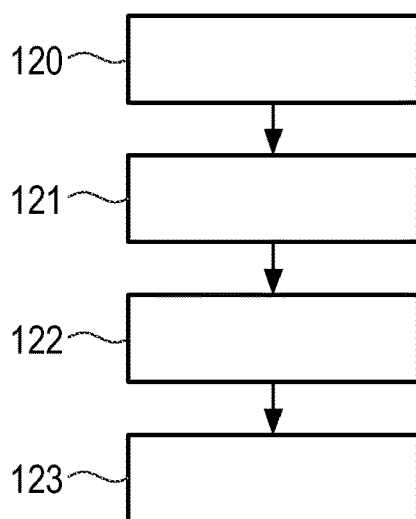
FIG. 5 shows a schematic illustration of a disclosed method of an exemplary embodiment of an electronic vehicle radio key.

FIG. 5 shows a schematic representation of a method of an electronic vehicle radio key 3 according to an exemplary embodiment. In a first method operation at 120, the method comprises sending at least one sequence of BLE advertising signals S1*b*. The sequence of BLE advertising signals S1*b* consists of a plurality of BLE advertising signals S1*b*.1, S1*b*.2. The sequence of BLE advertising signals S1*b* is sent to transportation vehicle 1, either passively periodically or once only, based on a user input.

After the sequence of BLE advertising signals S1*b* has been sent to the transportation vehicle 1 in the first method operation at 120, a BLE connection request signal S2*b* of the transportation vehicle 1 is received from the vehicle radio key 3 in a second method operation at 121. Based on the received BLE connection request signal S2*b*, a BLE data connection to the transportation vehicle 1 is established in a third method operation at 122.

In a fourth method operation at 123, BLE data signals S3*b* are sent and received by the electronic vehicle radio key 3 via the BLE data connection. The BLE data signals S3*b* may contain authentication data that is exchanged between the electronic vehicle radio key 3 and the transportation vehicle 1.

Figure 6:
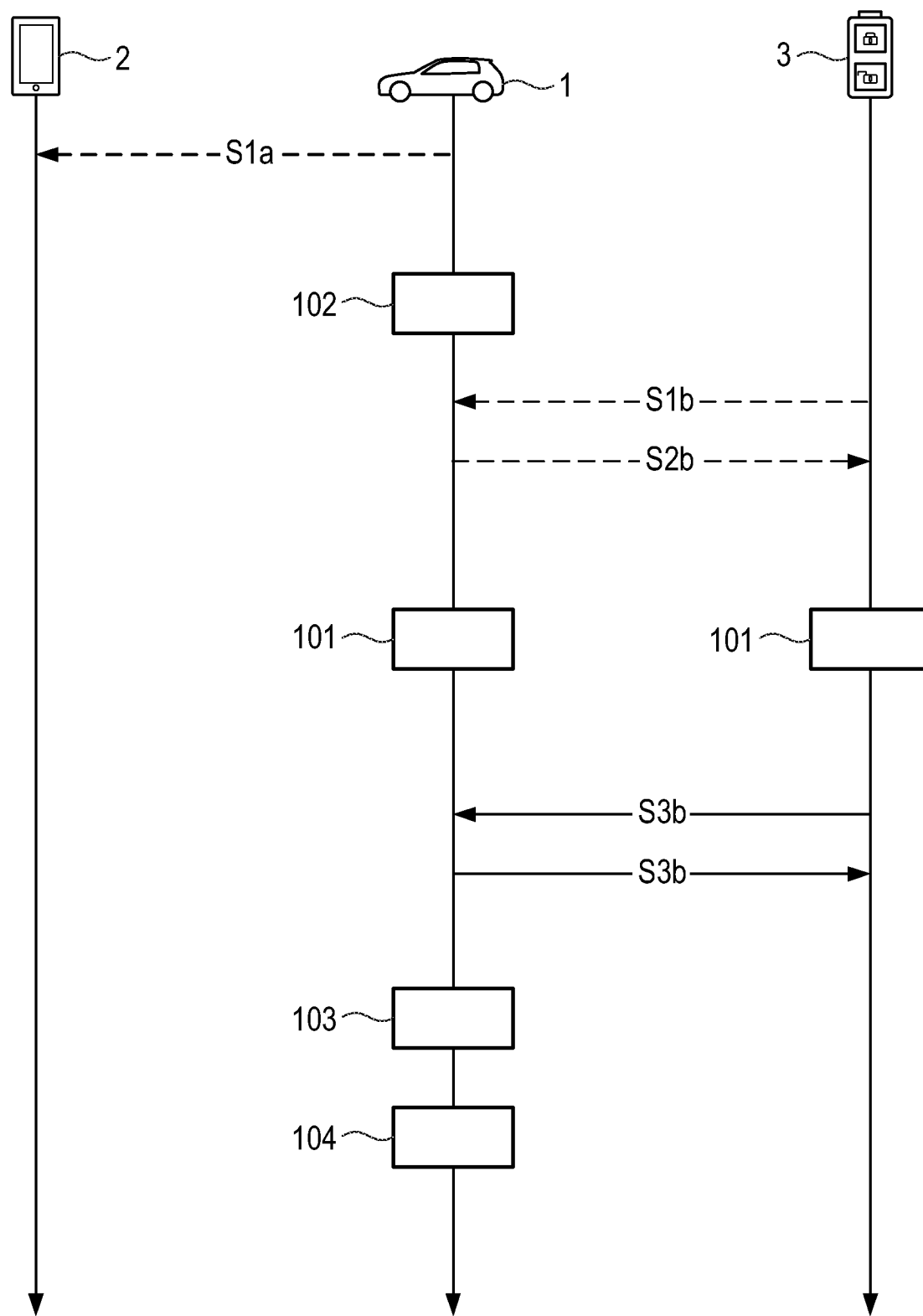
FIG. 6 shows a flowchart of a disclosed method for exemplary embodiments of a disclosed system.

FIG. 6 shows a flowchart of a disclosed method for a system 4 for passive access to a transportation vehicle 1 via a smartphone 2 and via an electronic vehicle radio key 3 according to an exemplary embodiment.

The transportation vehicle 1 sends a BLE advertising signal S1*a* to the smartphone 2, which includes an identification data item. However, the advertising signal contains an invalid identification data item. Therefore, the smartphone 2 does not send a connection request signal S2*a* to the transportation vehicle 1 and the establishment of a BLE data connection fails 102.

Subsequently, the transmission of a BLE advertising signal S1*b* with valid identification data from the electronic vehicle radio key 3 to the transportation vehicle 1 falls within a reception period of the transportation vehicle 1, so that the latter sends a BLE connection request signal S2b back to the electronic vehicle radio key 3. Based on the exchanged signals S1b, S2b, the transportation vehicle 1 and the vehicle radio key 3 then establish 101 a BLE data connection and the electronic vehicle radio key 3 sends a BLE data signal S3b via the BLE data connection and the transportation vehicle 1 sends another BLE data signal S3b back. At least one of the BLE data signals S3b contains authentication data, which enables an authentication of a user for access to the transportation vehicle 1.

In the next operation at 103 of the method described in FIG. 6, a ToF procedure is performed by the transportation vehicle 1. In this process the distance of the electronic vehicle radio key 3 from the transportation vehicle 1 is determined to be sufficiently small. Therefore, in a final operation at 104, the central locking system of the transportation vehicle 1 is activated to unlock the vehicle doors of the transportation vehicle 1.

In a further operation of the disclosed method (not shown), the vehicle radio key 3 is located inside transportation vehicle 1 by the UWB system 50. As a result of this, and possibly based on the exchange of further authentication data via BLE data signals, an immobilizer is deactivated.

LIST OF REFERENCE SIGNS 1 transportation vehicle
2 smartphone
3 electronic vehicle radio key
4 system
10 engine controller
20 control unit
21 CPU
22 internal memory
30 central locking system
34 first vehicle door
35 second vehicle door
36 third vehicle door
40 BLE system
41 BLE transceiver
42 BLE antenna
43 BLE module
44 BLE transceiver
45 BLE antenna
50 UWB system
51 UWB transceiver
52 UWB antenna
53 UWB module
54 UWB transceiver
55 UWB antenna
60 control unit
61 CPU
62 internal memory
63 first sensor
64 second sensor
65 third sensor
66 motion sensor
67 wireless charging device
70 NFC system
71 NFC transceiver
72 NFC antenna
74 NFC module
75 NFC transceiver
76 NFC antenna
77 electronic secure element (eSE)
101 establishment of a BLE data connection
102 failed attempt to establish a BLE data connection
103 time-of-Flight, ToF, procedure
104 activation of the central door locking
110 first method operation
111 second method operation
112 third method step operation
113 fourth method operation
114 fifth method operation
115 sixth method operation
120 first method operation
121 second method operation
122 third method operation
123 fourth method operation
A1 first time interval
A2 second time interval
A3 third time interval
Int1 advertising interval
Int3 advertising interval
K37 first advertising channel
K38 second advertising channel
K39 third advertising channel
R1 random delay
S1a BLE advertising signal from transportation vehicle
S1b BLE advertising signal from vehicle radio key
S2a BLE connection request signal from smartphone
S2b BLE connection request signal from transportation vehicle
S3 BLE data signal
Z1 first timing point
Z2 second timing point

The invention claimed is:

1. An electronic vehicle radio key for a transportation vehicle designed both to transmit BLUETOOTH® Low Energy (BLE) advertising signals and to receive BLE advertising signals, the BLE advertising signals of the transportation vehicle being transmitted periodically with a first time interval, wherein the transportation vehicle is further configured to receive BLE advertising signals between the transmission of each two BLE advertising signals by the transportation vehicle, the electronic vehicle radio key comprising:

a BLE module having at least one BLE transceiver configured to transmit BLE advertising signals to the transportation vehicle, to receive BLE connection request signals from the transportation vehicle, and for communication of BLE data signals via at least one antenna; and a control unit configured to:

activate the BLE module to control repeated transmission of at least one sequence of BLE advertising signals to the transportation vehicle, the repeated transmission of at least one sequence of BLE advertising signals being performed periodically at a second time interval such that the second time interval separates the transmission of the first BLE advertising signal in each sequence and retransmission of the first BLE advertising signal in the next sequence, wherein the at least one sequence contains at least two BLE advertising signals and the at least two BLE advertising signals are transmitted at times separated by a third time interval that is smaller than the first time interval, wherein the control of the timing of the repeated transmission of the at least one sequence of BLE advertising signals to the transportation vehicle is performed such that transmission is performed during a reception period for the transportation vehicle during which the transportation vehicle is able to receive BLE advertising signals transmitted as a result of itself not presently transmitting BLE advertising signals; and
  activate the BLE module, based on at least one received BLE connection request signal from the transportation vehicle, to establish a BLE data connection to the transportation vehicle and to transmit BLE data signals via the BLE data connection.

2. The electronic vehicle radio key of claim 1, wherein the transmission of at least one sequence of BLE advertising signals by the BLE module takes place periodically or once based on a user input.

3. The electronic vehicle radio key of claim 1, further comprising:
  a distance-determination module with at least one transceiver to send and receive radio signal pulses via at least one antenna, and/or
  a Near Field Communication (NFC) module with at least one NFC transceiver, a secure element and an antenna.

4. A method of an electronic vehicle radio key a transportation vehicle, the electronic vehicle radio key having a BLE module and a control unit, the transportation vehicle designed both to transmit BLUETOOTH® Low Energy (BLE) advertising signals and to receive BLE advertising signals, the BLE advertising signals of the transportation vehicle being transmitted periodically with a first time interval, wherein the transportation vehicle is further configured to receive BLE advertising signals between the transmission of each two BLE advertising signals by the transportation vehicle, the method comprising:
  transmitting at least one sequence of BLE advertising signals, repeated periodically at a second time interval such that the second time interval separates the transmission of the first BLE advertising signal in each sequence and retransmission of the first BLE advertising signal in the next sequence, wherein the at least one sequence contains at least two BLE advertising signals and the at least two BLE advertising signals are transmitted at times separated by a third time interval that is smaller than the first time interval, wherein the control of the timing of the repeated transmission of the at least one sequence of BLE advertising signals to the transportation vehicle is performed such that transmission is performed during a reception period for the transportation vehicle during which the transportation vehicle is able to receive BLE advertising signals transmitted as a result of itself not presently transmitting BLE advertising signals;
  receiving at least one BLE connection request signal;
  establishing a BLE data connection based on at least one BLE connection request signal and
  transmitting and receiving BLE data signals via the BLE data connection.

5. The method of claim 4, wherein the BLE data signals contain authentication data for authenticating a user for passive access to the transportation vehicle.

6. The method of claim 4, wherein the vehicle radio key transmits—the sequence of BLE advertising signals as a BLE slave to the transportation vehicle and transmits and receives the BLE data signals as a BLE master or as a BLE slave.

7. The method of claim 4, wherein the second time interval is longer than the first time interval and the third time interval is shorter than the first time interval.

8. The method of claim 4, wherein in response to transmitting the BLE data signals via the BLE data connection a central locking system of the transportation vehicle is activated based on the BLE data signals.

9. The electronic vehicle radio key of claim 1, wherein the second time interval is longer than the first time interval and the third time interval is shorter than the first time interval.

10. The electronic vehicle radio key of claim 1, wherein the BLE data signals contain authentication data for authenticating a user for passive access to the transportation vehicle.

11. The electronic vehicle radio key of claim 1, wherein the vehicle radio key transmits the sequence of BLE advertising signals as a BLE slave to the transportation vehicle and transmits and receives the BLE data signals as a BLE master or as a BLE slave.

\* \* \* \* \*